United States Patent Office 2,785,995
Patented Mar. 19, 1957

2,785,995

PROCESS OF IMPROVING THE WET STRENGTH AND DIMENSIONAL STABILITY OF CELLULOSE PAPER FIBERS AND REGENERATED CELLULOSE FILMS BY REACTING THEM WITH ACETALS AND PRODUCTS PRODUCED THEREBY

Bernard H. Kress, Ambler, Pa., assignor to Quaker Chemical Products Corporation, Conshohocken, Pa., a corporation of Pennsylvania No Drawing. Application May 13, 1955,
Serial No. 508,318

13 Claims. (Cl. 117—118)

This invention relates to a process of treating paper with a reactant in order to obtain improved physical properties.

Among the properties of paper which are improved, in accordance with the invention, when compared with untreated paper are wet tensile strength and wet tear strength, as well as dimensional control, especially at high humidities. Enhancement of these properties is especially desirable in paper products exposed to water. For example, such products as paper bags, building papers, outdoor posters and packing cases are often exposed to weathering by rain, etc. Improvement of the strength of these under such conditions is a desirable attainment. Paper products are used as drying and wiping materials as in towels and napkins, and they are also used as food wrappings. Wet strength improvement is a desirable feature in these applications. Finally, products such as filter paper, blueprint paper and photographic paper which are normally saturated with water at some stage of use benefit from enhanced wet strength and reduction of swelling. Map paper and business machine board, in particular, are upgraded by control of dimensions at high humidities.

The use of resins to impart wet strength is not novel. Thus, modified urea-formaldehyde and melamine-formaldehyde resins are used presently in imparting wet strength to paper.

One marked point of difference in this invention as compared with the prior art lies in the fact that the material used for treatment is non-resin forming, i. e., it will not polymerize further but acts as a reactant with cellulose.

A typical and preferred reactant may be prepared as follows:

Example I

| | | |
|---|---|---|
| Diethylene glycol | mole | 1 |
| Paraformaldehyde | do | 1 |
| Sulfuric acid | do | 0.001 |
| Toluene | ml | 25 | are mixed and heated under reflux in an apparatus equipped with a water trap. The solution is refluxed and water removed by azeotropic distillation. When 18 ml. of water of reaction is removed, the reaction is complete. The reaction mixture is neutralized with dilute sodium hydroxide solution and toluene is removed by evaporation in vacuo at temperatures not exceeding 110° C. The product is a viscous liquid setting to a crystalline mass at about 16° C. The product is completely water soluble and also soluble in toluene and esters.

The formulation above may be modified by use of dipropylene glycol, sorbitol, pentaerythritol, methyl 2-ethoxyethanol and other alcohols separately or in admixture as partial or complete substitutes for the diethylene glycol. Similarly, minor substitution of the formaldehyde by other aldehydes may be useful.

Under appropriate conditions of acidic catalysis these products, applied to paper, may be cured to achieve a substantial increase in wet strength. Such catalysts may either be acidic in nature or potentially acidic, i. e., capable of developing acidity when exposed to appropriate curing conditions of time, temperature and humidity. Included among catalysts which may be used for the purpose of this invention are salts such as zinc chloride, ammonium chloride, ammonium sulfate, ammonium thiocyanate, alums, sodium bisulfate, and the like. Organic or inorganic acids may likewise be employed, such as maleic anhydride, oxalic acid, citric acid, tartaric acid, diglycolic acid, phosphoric acid, ethyl acid phosphate, sulfuric acid, etc. Potentially acidic catalysts include such materials as dimethyl oxalate, methyl p-toluene sulfonate, and other compounds which are readily hydrolyzed to acidic components.

Furthermore, the reactants and catalysts of this invention may be applied either separately or conjointly at any convenient point prior to heating of the paper to reaction temperature. They may be, for example, used as components of the beater furnish. They may be added to the head box. They may be applied in some suitable manner on the Fourdrinier machine, as by spraying. They may be utilized as components of paper sizes. In specialized cases, such as parchment manufacture, they may be applied either before or after the parchmentizing operation. They may also be utilized in the manufacture of vulcanized fiber either before or during the step of treatment with zinc chloride. Under special circumstances, it may even be found desirable to treat paper as an additional step after manufacture.

The exact nature of the interaction between the cellulosic content of paper and the acetals of this invention is not known, but the retention of formaldehyde by the treated paper, even after repeated thorough washing, is permanent. My invention, therefore, although embracing the treatment of paper by chemical reaction with its cellulosic content, is not restricted to any specific reaction mechanism or any precise formula for the reaction product. The temperatures required to effect this reaction may vary widely, depending in large part upon the nature of the catalyst.

In order to demonstrate such application the following example may be given:

Example II

Sheets of paper were immersed in treating baths containing a reactant such as that shown in Example I dissolved in water in the percentages given in the following table, there being included in the solution the percentages of the catalysts indicated, permitted to drain, and then cured in a circulating hot air convection oven at 300–310° F. for seven minutes. The cured sheets were then cut into ¼" strips and placed individually between the jaws of a Scott tensile test machine. The strips were then saturated with water by use of a wash bottle and tensile strength determined. The reactant used was that prepared as specifically set forth in Example I.

| Percent of Reactant | Catalyst | Percent | Type of paper | Wet Tensile (gms.) |
|---|---|---|---|---|
| 3.5 | Zinc chloride | 0.2 | filter | 610 |
|  | Diglycolic acid | 0.8 |  |  |
| 3.5 | Zinc chloride | 1.0 | do | 658 |
| 1.4 | Potash Alum | 0.5 | do | 440 |
| none | none |  | do | 39 |
| 3.5 | Zinc chloride | 0.2 | Kraft | 532 |
|  | Diglycolic acid | 0.8 |  |  |
| 3.5 | Zinc chloride | 1.0 | do | 700 |
| none | none |  | do | 200–280 |

It may be here noted that the treatments specified above giving large increases in wet tensile strength may be carried out at much higher pH (e. g. around 5) than acid formaldehyde treatments heretofore employed in the paper-making art.

It is already known that when paper is treated with formaldehyde at a pH of less than 3.5, wet strength is improved. This process, however, has never been made commercially practicable because there is a marked loss in tear strength occasioned by degradation or tendering of the cellulose during treatment. (See "Wet Strength in Paper and Paperboard," TAPPI Monograph Series, #13 (1954), p. 7, published by the Technical Association of the Pulp and Paper Industry, New York City.)

However, in the use of the materials described herein, a gain in wet tear strength is observed, thus indicating the usefulness of the treatment. It should be particularly noted that one of the prime advantages accruing from my invention is also the total absence of obnoxious odors caused by free formaldehyde which render acid-formaldehyde treatments of the kind thus far known to the art highly objectionable and, in fact, completely impractical and dangerous to workmen exposed to such vapors during continuous processing of paper. The following is illustrative:

*Example III*

Sheets of paper were treated as in Example II. Measurement of wet tear strength was made by soaking 2" pieces of paper in water and submitting the sheets to test on an Elmendorf Tear Tester. The results are described in the table. Filter paper sheets were used in these tests.

| Percent Reactant | Catalyst | Percent | Percent of Untreated Paper Tear Strength |
|---|---|---|---|
| 3.5 | Zinc chloride | 0.2 | 259 |
|  | Diglycolic | 0.8 |  |
| 3.5 | Zinc chloride | 1.0 | 369 |
| None | None |  | 100 |

In the use of wet strength urea-formaldehyde resins usually about 2% of resin is used in order to obtain an increase in wet tensile strength of about 300–600% of the untreated paper's wet strength. It is observed that the use of reactants such as those described above will give rise to greater increases in wet strength with use of small amounts of reactant. For example:

*Example IV*

Filter paper sheets were treated with reactant as in the second example. The catalyst concentration of the treating bath was 0.5% of potash alum.

| Percent reactant: | Wet tensile (grams) |
|---|---|
| 0.175 | 503 |
| 0.35 | 536 |
| 0.70 | 770 |
| 1.40 | 440 |
| None | 40 |

Thus an increase of over 1200% is observed with less than 0.2% concentration of reactant in the treating bath.

The products described may be used in conjunction with other types of water soluble polymers, as typified by the following:

*Example V*

Various water soluble polymers were used in conjunction with the product described in Example I in order to obtain modified effects. Paper was treated as in Example II.

| Percent Reactant | Modifier | Percent | Catalyst | Percent | Wet Tensile, grams |
|---|---|---|---|---|---|
| 3.5 | None |  | Zinc chloride |  2.0 | 518 |
| 3.5 | Hydroxyethyl cellulose | 1 | do | 2.0 | 748 |
| 3.5 | Hydroxyethyl Starch | 1 | do | 2.0 | 440 |
| 3.5 | Polyvinyl alcohol | 0.5 | do | 2.0 | 498 |
| None | None |  | None | 41 | 41 |

In using this reactant described in Example I and similar materials, other advantages may accrue. Thus no build-up of resin is possible on woolen felts and in circulating water systems, and economies may result from such use.

In order to achieve relatively high wet tensile strength, only small amounts of reactant are necessary. This results in a less harsh, stiff or brittle paper than if amine resins are used. In addition, much softer and adsorbent papers may be made, thus increasing consumer appeal.

Since the products described herein do not polymerize by themselves, there is no storage problem as to time and temperature as is usually the case in amine-aldehyde resins.

The above description is not intended to limit use to any specific type of paper or paper product. It has been found that the products and process may be applied to such cellulose containing products as "cellophane" or regenerated cellulose, parchment, straw, cordage (jute, etc.) and other non-textile compositions.

The product and process may be used along with starches, gums, rosin, vinyl resins, inorganic fillers such as clay, and the like.

The product may show considerable value even in concentrations as low as 0.02% in some paper products. Cost of application and the law of diminishing returns apply in upper limits of application. However, it is probably not necessary to go over 15% application in order to achieve good results.

As further examples of production of reactants which may be used in the treatment of paper besides that given in Example I the following may be cited:

*Example VI*

|  | Parts |
|---|---|
| Diethylene glycol | 85 |
| Dipropylene glycol | 27 |
| Paraformaldehyde (91%) | 33 |
| Toluene | 20 |
| Sulfuric acid (99%) | 0.1 |

These reactants were treated as in Example I. The resulting product was a viscous liquid which formed a crystalline mass below 0° C. The product was soluble in water and in toluene and had a faint ethereal odor.

*Example VII*

|  | Parts |
|---|---|
| Diethylene glycol | 80 |
| Sorbitol—crystalline | 32 |
| Paraformaldehyde (91%) | 30 |
| Toluene | 30 |
| Sulfuric acid (99%) | .1 |

These reactants were treated as in Example I. The product was a crystalline mass at room temperature, soluble in toluene and in water, and with virtually no odor.

*Example VIII*

|  | Parts |
|---|---|
| Diethylene glycol | 106 |
| Paraformaldehyde (91%) | 52 |
| Glyoxal (30%) | 39 |
| Toluene | 20 |
| Sulfuric acid (99%) | 0.1 |

These components were reacted as in Example I. The product was a somewhat viscous yellow liquid with a faint ethereal odor. The product was soluble in water and in toluene.

Polymeric condensation products may also be made starting with dipropylene glycol, dibutylene glycols and higher dialkylene glycols, polyalkylene glycols, mixtures thereof, or their mixtures with diethylene glycol which are reactive with formaldehyde or other aldehydes to form water-soluble products or products which are dispersible in water, either alone or with the aid of appropriate adjuvants. Polyalkylene glycols, such as triethylene glycol, tetraethylene glycol, tripropylene glycol and the like, may also be used, either alone or in admixture with the aforementioned dialkylene glycols. Likewise polyols, such as glycerine, pentaerythritol and sorbitol, may be added to the alkylene glycols in amounts up to about 50 mol. percent of the glycols for reaction with the aldehyde for forming water-soluble or water-dispersible products. Instead of the paraformaldehyde of the above examples, trioxane, methylal, aqueous formalin and similar formaldehyde-generating compounds may be used. Instead of formaldehyde, other reactive aldehydes, such as acetaldehyde, propanal, butanal, benzaldehyde, glyoxal, terephthalaldehyde and other dialdehydes, containing not more than 8 carbon atoms in the monomeric form, and mixtures thereof, may be used in forming water-soluble or water-dispersible condensation products with the alkylene glycols. The term "alkylene" is understood to include a doubly unsatisfied aliphatic radical containing a substituted or unsubstituted straight chain possessing from two to four carbon atoms in the chain and having its unsatisfied valences on either adjacent or separated carbon atoms.

If desired, the polymeric chains of the compounds used may be terminated, either in whole or in part, by means of an alkyl radical possessing not more than 8 carbon atoms. The alkyl radical may be introduced in any suitable manner. I may, for example, co-react an aldehyde and a glycol in the presence of a minor amount of a half ether of a glycol to serve as a chain stopper. Such a preparation is illustrated in the following example:

*Example IX*

| | Parts |
|---|---|
| Diethylene glycol | 101 |
| Beta methoxyethanol | 4 |
| Paraformaldehyde (91%) | 30 |
| Toluene | 20 |
| Sulfuric acid (99%) | 0.1 |

The above materials were reacted as in Example I to yield a viscous liquid possessing a faint ethereal odor and soluble in water. Its polymeric nature was shown by Rast molecular weight determination which had a value of 637.

It is preferred to react substantially equimolar ratios of the aldehyde to the polyglycol in making the condensation products, but there may also be used an excess of either reactant. In forming the condensation products, it is necessary to have a strongly acidic catalyst present, such as sulfuric acid, alkane sulfonic acids, phosphoric acids, or metallic halides, such as zinc chloride, stannic chloride, aluminum chloride, acid clays, and the like. In general, those catalysts well-known to the art for alkylation, esterification and Friedel-Crafts condensation reactions may be employed in making the condensation products. It is preferred to have toluene present as an azeotropic liquid medium which does not interfere with the reaction. Other azeotropic vehicles which may be used are benzene, xylene, ethyl benzene, and the like.

The condensation products thus far described are of polymeric nature, as illustrated by the molecular weight (480) of the product of Example I. By polymeric, it is meant that the condensation products contain two or more aldehyde units and two or more polyhydric alcohol units per molecule of condensation product.

It has been further found that the above-mentioned objects may likewise be accomplished by treating paper with simple non-polymeric acetals of monoaldehydes and dialdehydes containing up to eight carbon atoms in the presence of an acidic catalyst.

Suitalde aldehydes which may be converted to either simple or polymeric acetals in this process are formaldehyde, acetaldehyde, propanal, butanal, glyoxal, and other dialdehydes containing not more than eight carbon atoms in the monomeric form, such as malonaldehyde, succinaldehyde, glutaraldehyde, adipaldehyde, hydroxy adipaldehyde, terephthalaldehyde and the like. Suitable alcohols which may be combined with the above-mentioned aldehydes to form simple acetals are methanol, ethanol, propanol, isopropanol, butanol, methoxy ethanol, ethoxyethanol, methoxyethoxy ethanol, ethylene glycol, glycerine, pentaerythritol and dipentaerythritol. I may also use acetals derived from other polyhydric alcohols, such as, for example, the simple formal of diethylene glycol, i. e.:

$$(HO \cdot CH_2 \cdot CH_2 \cdot O \cdot CH_2 \cdot CH_2 \cdot O)_2 \cdot CH_2$$

or $$(\cdot O \cdot CH_2 \cdot CH_2 \cdot O \cdot CH_2 \cdot CH_2 \cdot O) \cdot CH_2$$

I may also use mixed formulas, such as $$H_3C \cdot O \cdot CH_2 \cdot O \cdot CH_2 \cdot CH_2 \cdot O \cdot CH_2 \cdot O \cdot CH_3$$
$$H_3C \cdot O \cdot CH_2 \cdot O \cdot CH_2 \cdot CH_2 \cdot O \cdot CH_2 \cdot CH_2 \cdot OH$$

or $$H_3C \cdot O \cdot CH_2 \cdot O \cdot CH_2 \cdot CH_2 \cdot O \cdot CH_2 \cdot CH_2 \cdot O \cdot CH_2 \cdot O \cdot CH_3$$

or mixtures thereof. In general, the acetals are prepared by reacting the aldehydes and the alcohols in the presence of acidic catalysts by well-known procedures.

The acetals which may be used may be, for example, di(methoxy ethoxy ethyl) formal, di(methoxy ethyl) formal, glyoxal tetra(methoxy ethyl) acetal, malonaldehyde tetra ethyl acetal, malonaldehyde tetra methyl acetal, malonaldehyde tetra (methoxy ethyl) acetal, glyoxal tetra methyl acetal, glyoxal tetra ethyl acetal, glyoxal tetra butyl acetal, 2-hydroxy adipaldehyde tetra (methoxy ethyl) acetal, succinaldehyde tetra (methoxy ethyl) acetal, and mixed acetals, such as methyl methoxy-ethyl formal, malonaldehyde methyl triethyl acetal and glyoxal dibutyl dimethoxyethyl acetal. The mixed acetals may be prepared by reacting the aldehyde with a mixture of the alcohols or by carrying out an exchange reaction with a given acetal with the desired alcohol. Other non-polymeric formals which exist as ring systems may also be employed as, for example, pentaerythritol diformal, dipentaerythritol diformal, 1,4,5,8-naphthodioxane, dioxolane, etc. In general, it is preferred to use acetals derived from an aldehyde containing one to eight carbon atoms and having alcohol fragments containing one to six carbon atoms.

These acetals are applied as in Example II given above. For instance,

*Example X*

A 1% paper pulp dispersion was prepared by beating shredded white filter paper in water in a Waring Blendor for one minute 5% of dioxolane and ½% of potash alum (on the bath weight) were then added while stirring and agitation was continued for another 15 seconds. The pulp was then emptied into a breaker and allowed to stand for 15 minutes with occasional stirring. The contents were poured into a Büchner funnel, stirring slightly to insure even distribution of the pulp. After partial drying by suction, the paper sheet thus formed on the funnel surface was dried in an oven at 180° F. and cured for 5 minutes at 315° F. The paper was then pressed twice by running through a cold calender. Samples were cut ¼" wide for determination of wet tensile strength as described in Example II. Strips thus tested showed a tensile strength value of 458 grams as compared to 123 grams for a sample similarly prepared without chemical treatment.

While reference has herein been made primarily to the treatment of sheeted paper with the formal reactants, these reactants may be introduced with catalysts (as described above) into the pulp suspension prior to sheeting, quantities be used to secured concentrations of the reactants in the final sheets corresponding to those obtained by treating finished paper. Resulting increases in wet strength are of the same order as those previously discussed.

The reactants described above are also advantageously used (with catalysts as described above) in the treatment of papers coated with starches, modified starches, polyvinyl alcohol, water-soluble cellulose derivatives such as hydroxyethyl cellulose and methyl cellulose, as well as other hydroxyl-bearing polymeric materials, serving to insolubilize these materials to improve water and other resistance.

Reduction of fiber and paper swelling has also been noted as the result of treatments with reactants as described in Example XI.

*Example XI*

Sheets of paper of the type commonly used for wax coating in the manufacture of waxed paper were padded through solutions as listed below. They were then dried and cured at 315° F. for 15 minutes. Samples were marked at 18 inches and then exposed to 60% relative humidity at 70° F. for two hours. Other samples were hung in an atmosphere of 95% relative humdity at room temperature overnight.

After removal from the humid atmospheres just stated, the samples were measured immediately, showing the results given below:

| Percent Reactant of Example I | Catalyst, Type and Concentration | Percent Expansion of 18" marked paper sheet | |
|---|---|---|---|
| | | 60% R. H. | 95% R. H. |
| 0.7 | Potash alum, 0.5 | 0.15 | 0.35 |
| 2.1 | do | 0.15 | 0.44 |
| 3.5 | do | 0.13 | 0.37 |
| 0.7 | Zinc chloride, 0.5 | 0.26 | 0.59 |
| 2.1 | do | 0.22 | 0.35 |
| 3.5 | do | 0.26 | 0.74 |
| None | None | 0.46 | 1.05 |

In summary of the foregoing, the invention relates to a process for modifying a cellulosic paper product which comprises treating said paper product in any stage of its manufacture with an aqueous bath containing an acetal derived from an aldehyde containing from one to eight carbon atoms and a hydroxyl-bearing compound containing at least one continuous carbon chain possessing from one to six carbon atoms selected from the group consisting of alcohols, glycols, polyglycols, polyhydric alcohols, glycol monoethers, and partial ethers of polyhydric alcohols, and curing said treated paper product under acidic conditions in order to cause interaction between its cellulosic content and said acetal, and the products of such processing. More specifically, the acetal may be derived from a mixture of aldehydes and hydroxyl-bearing compounds as just defined. Either, or both, monomeric or polymeric acetals may be involved.

What is claimed is:

1. The process of improving the wet strength and dimensional stability of cellulose paper fibers and regenerated cellulose films which comprises applying to said cellulose materials an aqueous bath containing an acid catalyst and, as the essential agent, an acetal of an aldehyde selected from the group consisting of aliphatic and carbocyclic aldehydes having 1 to 8 carbon atoms in monomeric form and mixtures of the aforesaid aldehydes, and an aliphatic hydroxyl-bearing compound selected from the group consisting of aliphatic monohydric alcohols containing from 1 to 5 carbon atoms, monoalkylene and polyalkylene glycols in which the alkylene radical has from 2 to 4 carbons atoms in a straight chain, and aliphatic polyhydric alcohols containing from 3 to 6 hydroxyl groups and from 3 to 10 carbon atoms and mixtures of the aforesaid hydroxyl-bearing compounds, said acetal being applied in amount from about 0.02% to about 15% by weight of the dry cellulose, said catalyst being present in the bath at least in amount from about 10% to about 285% based on the weight of the acetal and heating the cellulose materials at elevated temperature until the acetal reacts with the cellulose and improves the wet strength and dimensional stability of the cellulose.

2. The process of improving the wet strength and dimensional stability of cellulose paper fibers and regenerated cellulose films which comprises applying to said cellulose materials an aqueous bath containing an acidic catalyst and, as the essential agent, an acetal of an aldehyde selected from the group consisting of aliphatic and carbocyclic aldehydes having 1 to 8 carbon atoms in monomeric form and mixtures of the aforesaid aldehydes, and an aliphatic hydroxyl-bearing compound selected from the group consisting of monohydric alcohols containing from 1 to 5 carbon atoms, monoalkylene and polyalkylene glycols in which the alkylene radical has from 2 to 4 carbon atoms in a straight chain, and aliphatic polyhydric alcohols containing from 3 to 6 hydroxyl groups and from 3 to 10 carbon atoms and mixtures of the aforesaid hydroxyl-bearing compounds, said acetal being present in the bath from about 0.175% to about 5% by weight, said catalyst being present in the bath at least in amount from about 10% to about 285% based on the weight of the acetal and heating the cellulose materials at elevated temperature until the acetal reacts with the cellulose and improves the wet strength and dimensional stability of the cellulose.

3. The process of improving the wet strength and dimensional stability of cellulose paper fibers and regenerated cellulose films as defined in claim 1 wherein the acetal in the aqueous bath is the acetal of diethylene glycol and formaldehyde.

4. The process of improving the wet strength and dimensional stability of cellulose paper fibers and regenerated cellulose films as defined in claim 1 wherein the acetal in the aqueous bath is the condensation product of diethylene glycol, dipropylene glycol and formaldehyde.

5. The process of improving the wet strength and dimensional stability of cellulose paper fibers and regenerated cellulose films as defined in claim 1 wherein the acetal in the aqueous bath is the condensation product of diethylene glycol, sorbitol and formaldehyde.

6. The process of improving the wet strength and dimensional stability of cellulose paper fibers and regenerated cellulose films as defined in claim 1 wherein the acetal in the aqueous bath is the condensation product of diethylene glycol, formaldehyde and glyoxal.

7. The process of improving the wet strength and dimensional stability of cellulose paper fibers and regenerated cellulose films as defined in claim 1 wherein the acetal in the aqueous bath is malonaldehyde tetraethyl acetal.

8. Cellulose paper fibers and regenerated cellulose films having improved wet strength and dimensional stability made by the process of claim 1.

9. Cellulose paper fibers and regenerated cellulose films having improved wet strength and dimensional stability made by the process of claim 3.

10. Cellulose paper fibers and regenerated cellulose films having improved wet strength and dimensional stability made by the process of claim 4.

11. Cellulose paper fibers and regenerated cellulose films having improved wet strength and dimensional stability made by the process of claim 5.

12. Cellulose paper fibers and regenerated cellulose films having improved wet strength and dimensional stability made by the process of claim 6.

13. Cellulose paper fibers and regenerated cellulose films having improved wet strength and dimensional stability made by the process of claim 7.

References Cited in the file of this patent

UNITED STATES PATENTS

| | | |
|---|---|---|
| 2,136,110 | Lane | Nov. 8, 1938 |
| 2,207,740 | Kaase et al. | July 16, 1940 |
| 2,285,490 | Broderick | June 9, 1942 |
| 2,350,350 | Gresham | June 6, 1944 |
| 2,360,477 | Dahle | Oct. 17, 1944 |

FOREIGN PATENTS

| | | |
|---|---|---|
| 527,888 | Great Britain | Oct. 17, 1940 |